Figure 1:
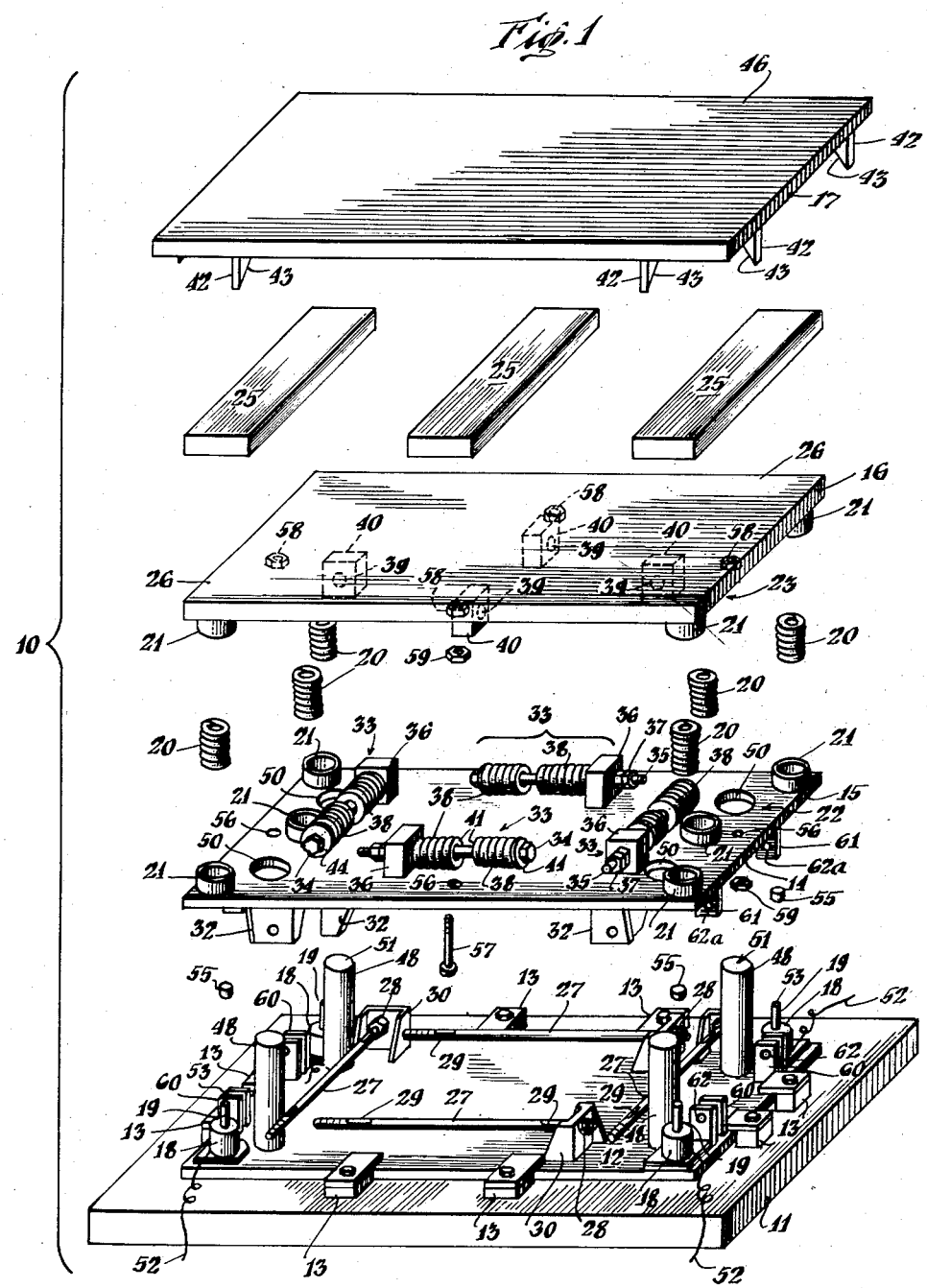

April 17, 1956     R. J. CARLETON, JR     2,742,278
WEIGHING APPARATUS
Filed Aug. 29, 1951     2 Sheets—Sheet 1

INVENTOR.
Richard J. Carleton, Jr.
BY
Robert J. Dunham
ATTORNEY

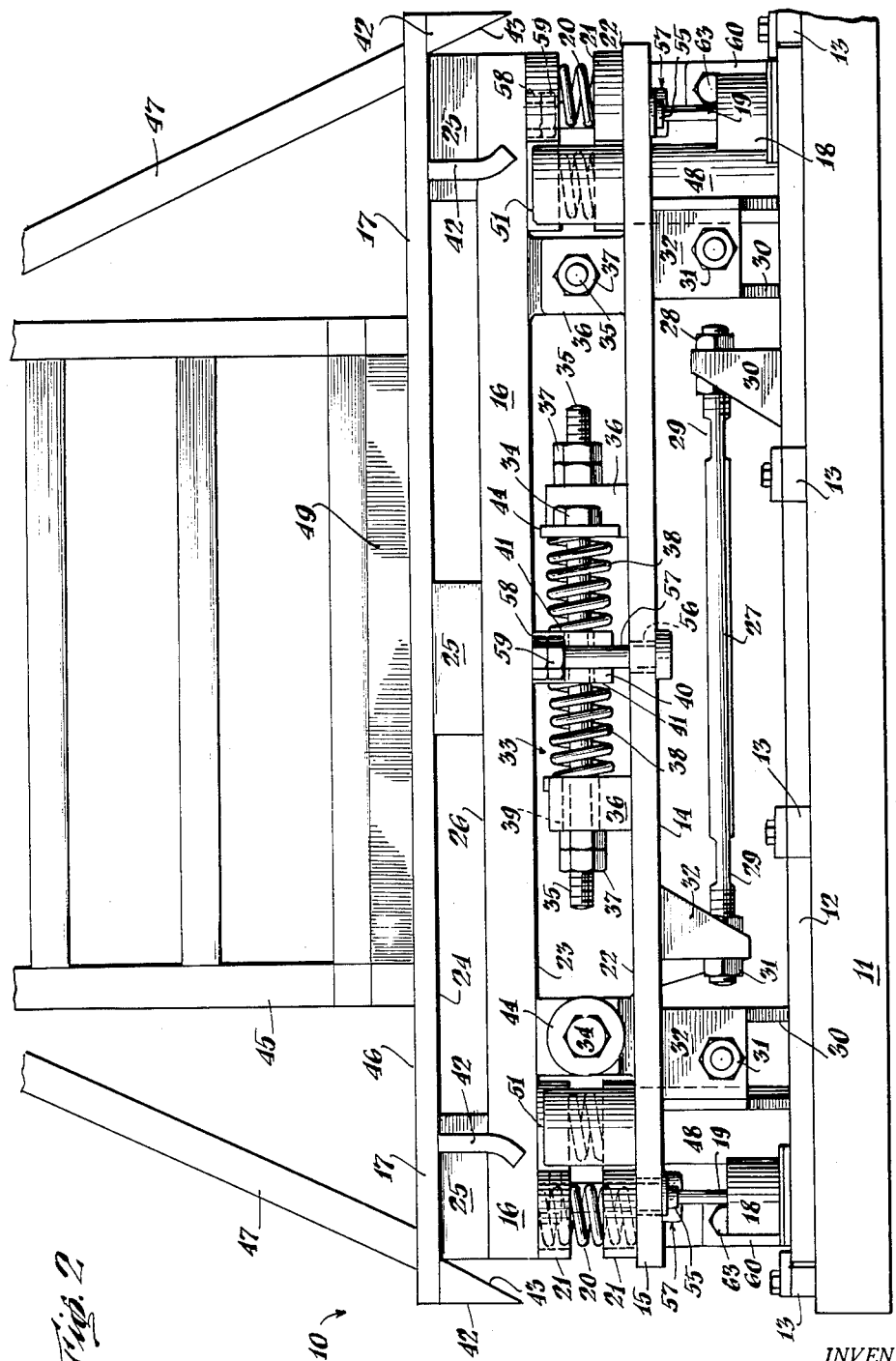

United States Patent Office 2,742,278
Patented Apr. 17, 1956

2,742,278

WEIGHING APPARATUS

Richard J. Carleton, Jr., Chagrin Falls, Ohio, assignor to Republic Steel Corporation, Cleveland, Ohio, a corporation of New Jersey Application August 29, 1951, Serial No. 244,161

16 Claims. (Cl. 265—27)

This invention relates to weighing apparatus and particularly to a type of scales which is adapted for weighing heavy massive loads, and, which, in the course of use, is subject to impact forces in excess of the loads to be weighed.

One use for which such scales are adapted is for the weighing of hot steel ingots immediately after the ingots have been stripped from their molds and before they are placed in soaking pits. The weighing apparatus is used to weigh the static loads of the ingots placed thereon, the equipment being designed for a maximum weight capacity, but being subjected to high vertical impact forces in excess of the weight capacity. The impact forces are caused by the dropping or rough handling of the ingots onto the weighing apparatus from a crane or other supporting means. Such apparatus is also subjected to and must withstand lateral or horizontal impacts which are caused by the ingot suspended from the crane colliding with the weighing equipment.

In order to meet the exigencies of such use, weighing equipment has been made of massive construction to withstand the impact forces involved. However, in spite of the heavy construction, such devices have been subject to breakdowns because of their inability to absorb and distribute the high impact forces.

An important object of this invention is to provide a weighing apparatus which is not of unusually heavy construction but has sufficient strength to weigh the static weight of loads placed on the apparatus and is also capable of absorbing and distributing the vertical impact forces in excess of the maximum designed weight capacity of the device and to withstand the horizontal or lateral impact forces encountered in such use.

Another object of this invention is to provide a device in which the weight sensitive means will not be damaged by an overload due to the impact of the article to be weighed.

The invention includes an apparatus for weighing loads up to a predetermined weight and for withstanding vertical impact loads above the predetermined weight load and for withstanding lateral disarrangement of the apparatus. The invention comprises, a plurality of substantially horizontal platforms arranged in parallel relation to each other. Resilient means are provided for maintaining the platforms in spaced vertical relationship. Other means are provided for maintaining the platforms in substantially fixed lateral relationship without interfering with relative vertical movement of the platforms. Weighing means are disposed between two of the platforms and are adapted for actuation by the movement of two of the platforms toward each other. Additional means are also provided for limiting the movement of the two platforms together when the apparatus is subjected to a vertical impact load greater than the predetermined weight.

The invention as presently contemplated may include more than two horizontal platforms, and the means for limiting the movement of the platforms together may be column means fixed on one of the platforms on which the weighing means is disposed and adapted to abut another non-adjacent platform.

For a more complete description of the invention, reference is made to the drawings wherein:

Fig. 1 is an exploded view of one form of apparatus embodying the invention; and Fig. 2 is a side view of the apparatus with the parts arranged in operative position and with an ingot receiving basket positioned on the upper platform thereof.

The scale 10 for weighing articles includes a base plate 11 upon which is located the scale bottom platform 12 which is maintained in position on the base plate 11 by suitable means such as lift stops 13. A middle scale platform 15, an upper scale platform 16 and an ingot basket platform 17 are also included in the device. The several platforms are disposed in spaced parallel relationship as illustrated in Fig. 2 by means disposed between the platforms.

The middle scale platform 15 is supported in parallel vertical spaced relation to the bottom platform 12 by four electric load cells 18 suitably fixed to the platform 12, the vertical push rods 19 on or resting on the load cells 18, engaging the underside 14 of the middle platform 15. The upper ends 53 of the push rods 19 are received in seats 55 which are welded or otherwise fixed to the underside 14 of the middle platform 15 as best shown in Fig. 2.

The middle scale platform 15 in turn provides supports for maintaining the upper scale platform 16 in spaced relationship. The supports include vertical load shock springs 20 mounted in spring retainers 21 fixed respectively on upper surface 22 of middle platform 15 and lower surface 23 of the upper scale platform 16.

Relatively thick, wide strips 25 of suitable resilient material such as impact cork, i. e. shock absorbing cork, are positioned on upper face 26 of the upper scale platform 16 and act to support the ingot basket platform 17 in spaced relation to the upper scale platform 16.

The platforms are located and maintained in the desired lateral relationship to each other by means of coacting members on adjacent faces of adjacent platforms.

Between bottom scale platform 12 and middle scale platform 15, tie rods 27 are disposed to prevent lateral shifting of those platforms with respect to each other. One end of each tie rod 27 is connected to a bracket 30 fixed to the bottom platform 12, the tie rod being held in the bracket 30 by nuts 28. The other end of each tie rod is connected to a bracket 32 fixed on the underside 14 of platform 15, the tie rod being held in the bracket 32 by nuts 31. Two of the tie rods are disposed at right angles to the other two tie rods to prevent lateral movement in any direction. When the tie rods 27 are assembled they maintain the platforms 12 and 15 substantially fixed with respect to each other in the horizontal direction. However, the rods will deflect in the vertical direction to permit the platforms 12 and 15 to move vertically with respect to each other to allow the load from the middle platform 15 to be transmitted to the load cells 18, the limited vertical movement of the platforms being effected by a slight bending of the rods 27 in flattened regions 29 thereof, or by other suitable means.

The tie rods 27 are oriented in the same direction, i. e. with the brackets 30 for each pair at the same side of bottom platform 12, so that any temperature expansion or contraction of the tie rods will cause a straight lateral or sidewise movement of the scale parts, rather than a twisting movement, as if about a vertical axis, which might result if the brackets 30 for each pair of tie rods were placed at opposite sides. Such lateral movement may cause appreciable and undesirable twisting when the scale of this invention is elongated in one direction for weighing long articles such as sections of railroad track.

To locate, i. e. center, the upper scale platform 16 in a horizontal direction with respect to the middle scale platform 15, four side load shockspring assemblies 33 may be used. Each of the assemblies 33 include a rod 35, a bracket 36 attached to the middle scale platform 15, and a block 40 fixed on the underside 23 of the upper scale platform 16. When the apparatus is assembled, as shown in Fig. 2, the rods 35 of the several assemblies 33 are passed through holes 39 in the brackets 36 and blocks 40 and springs 38 are mounted on the rods so that the inner sides 41 of the springs 38 contact the blocks 40. The rods 35 are held in position by nuts 37 and the cooperating springs 38 on the rods. The outer end 34 of each rod 35 is provided with a head and a retaining plate 44 to hold the spring adjacent the outer end in assembly. Any motion in the horizontal direction of the upper scale platform 16 compresses two or more of the springs. The assemblies 33 are arranged at right angles to each other and serve to cushion the shock of any side load and prevent lateral impact force from damaging the equipment. As shown in Fig. 2, the holes 39 in the brackets 36 and blocks 40 are of sufficiently greater diameter than the diameter of rods 35 to permit limited vertical movement of the upper platform 16 and the middle platform 15 with respect to each other.

The ingot basket platform 17 is maintained in proper lateral relationship to the upper scale platform 16 by means of the ears 42 projecting from the underside 24 of the platform 17 adjacent the four sides thereof. The ingot basket platform 17 is larger than the upper platform 16 so that the inner sloping faces 43 formed on ears 42 serve to guide the ingot basket platform into proper position on the upper platform 16, the sloping faces bearing against the edges of the upper platform 16 as the platforms move together. The arrangement of the ears 42 on the four sides of the ingot basket platform 17 serves to prevent lateral displacement in any direction.

A suitable ingot receiving basket 45 may be fixed on upper surface 46 of the ingot basket platform 17. Suitable braces 47 for the basket 46 may be provided. A flooring 49 of steel billets welded as a grill may be provided in the bottom of the basket 45.

Also included in the apparatus are four bumper bars 48 which are suitably fixed, as by welding, on the bottom scale platform 12 and extend upwardly through openings 50 formed in the middle scale platform 15, the openings 50 being sufficiently large to permit the bars 48 and the platform 15 to move vertically relative to each other. Upper ends 51 of the bumper bars 48 in the normal position, shown in Fig. 2, are spaced a slight distance, e. g. about one half inch, from the undersurface 23 of upper scale platform 16.

As an example of the size of the apparatus contemplated, it may be noted that the platforms are approximately 8' in length and 4' in width and from 3"–4" in thickness. The apparatus is designed to sustain the vertical impact loads occurring when steel ingots of 20,000 lbs. are roughly lowered into the ingot basket 45 which is mounted on platform 17. It will be understood that these dimensions are merely illustrative and that the invention may be embodied in apparatus of any suitable dimensions.

In operation, the load placed on the ingot basket platform 17 is supported by the impact cork strips 25, by the upper scale platform 16, the six vertical load shock springs 20, the middle platform 15 and finally by the four load cells 18. The load cells used in the weighing apparatus are of a conventional type and employ, as electrical pick-up elements, standard type strain gages. The sensitive element of each cell may be a steel column, tube or ring. The sensitive element has the strain gage (not shown) bonded to its side in a suitable manner so that under a load the dimensions of the steel column change slightly, causing the wire of the strain gage to stretch or compress. When the cross-sectional area of the wire is changed by the stretching or compression, its electrical resistance will be increased or decreased.

The wire of the strain gage carries an electric current, so that a change in resistance causes a change in voltage. The voltage change may be transmitted to an electric weight recording instrument (which may be of conventional character and is therefore not shown) by means of suitable cables 52.

The load cells are capable of response to large forces over a wide range and have the ability to function without appreciable actual compression or displacement of the cell except for the slight dimensional change noted. The load cells described are standard equipment of known design (one such type cell which has been found satisfactory is known as the Baldwin SR–4 Load Cell), therefore, no further details or illustrations of their functioning are included herein. However, it will be appreciated that any other suitable weight responsive means may be employed.

The vertical load shock springs 20 have been preloaded to sustain a total force slightly in excess of the maximum weight ingot to be weighed. When the ingot to be weighed is dropped on the scale, if the impact force, thereby resulting, exceeds the maximum ingot weight (as it usually or often will), the springs will be caused to depress and the upper scale platform 16 will be caused to move downward. As the impact force or momentum, present at such impact, continues and the upper scale platform 16 moves downward, the space between the lower surface 23 of the platform 16 and the upper ends 51 of each of the bumper bars closes until the entire load on the upper scale platform 16 is supported on the four bumper bars 48. As noted the push rods 19 and cells 18 are substantially incompressible, and because of the deflection of the springs 20, the impact overloads are taken by the bumper bars 48 and therefore the push rods 19 are not subject to impact overloads of any substantial amount. At this point the vertical springs 20 can no longer deflect so that any remaining momentum which has been or is transmitted to the upper scale platform 16 will be absorbed through the bumper bars 48, thus resisting the downward motion of the upper platform 16, while any additional momentum against the ingot basket platform 17 will cause deflection, e. g. compression of the impact cork strips 25. The cork strips 25 will deflect or compress until all momentum or force of the impact has been absorbed, the only downward force will then be the static weight of the ingot. Thereafter the vertical load shock springs 20 will expand to their normal position, shown in Fig. 2, and lift the upper scale platform 16 from the ends 51 of the bumper bars 48. In the position shown in Fig. 2, the entire ingot weight from the ingot basket platform 17 down through the apparatus will be transmitted to the load cells 18 so that the static weight of the ingot may be determined by the load cells in the manner described above.

Vertical bolt members 57 may be provided between platforms 15 and 16 to prevent diarrangement of the device when the vertical load springs 20 expand to their normal position after having been depressed. Each bolt 57 is passed through an opening 56 in the platform 15 and the threaded end thereof is connected to the platform 16 by being screwed into a nut 58 fixed to the underside 23 by welding or by other suitable means. In addition to limiting the rebound of the vertical shock springs 20, the bolts 57 are also used for preloading the springs 20 to an amount slightly in excess of the maximum weight ingot to be weighed. The preloading is effected by adjustment of the bolts 57 in the nuts 58 and locking them in the desired position by means of lock nuts 59.

To provide additional means for locating the middle platform 15 with respect to the bottom scale platform 12, and to limit vertical movement of those platforms, pairs of spaced brackets 60 may be fixed on the bottom platform 12 and lugs 61 adapted to fit between the spaced brackets 60 may be fixed to the underside 14 of the platform 15. The brackets 60 and the lugs 61 may be provided with corresponding holes 62, 62a, respectively, through which bolts 63 may be passed. The holes 62, 62a in either brackets 60, lugs 61, or both (advantageously, for instance, only the holes 62a in lugs 61), may be slightly larger in diameter than the bolts 63 to permit limited relative vertical movement between platforms 12 and 15. In the normal position the pins or bolts 63 rest in the holes 62 of the brackets 60 and are completely clear of any part of the lugs 61, so that there is no interference in the weighing operation. If the scale is struck from the side or is lifted, the members 60, 61 and 63 will prevent the center platform 15 from being lifted away from the bottom platform 12 further than the clearance allowed in the holes 62. Without the members 60, 61 and 63, the platform 15 might be lifted high enough so that the push rods 19 would become displaced from the seats 55 on the underside of platform 15.

There is relatively little downward movement of the lugs 61 with respect to the brackets 60 during the impact overload because the push rods 19 are not compressible. With the springs 20 between platforms 15 and 16, the downward motion is limited to plate 16 which can be depressed about one-half inch before it hits the bumper bars 48.

It will be appreciated that the vertical load shock springs 20 and the impact cork strips 25 absorb a substantial amount of the initial impact force resulting when the ingot is dropped into the basket 45, but, if the force exceeds the pre-loaded capacity of the vertical load shock springs 20, the additional impact force will be transferred to the bumper bars 48 and will be distributed through and absorbed in the bottom platform 12 and the base plate 11 in one direction and will be distributed through and absorbed in platform 16 and the impact cork strips 25 in the other direction to prevent damage to the load cells 18. Moreover, the excess force or energy thus to be absorbed by the bumper bars 48 is much less than the total, original impact force or energy (and is ultimately further reduced by absorption in the compression of the cork elements 25) so that an exceptionally massive construction of the parts, such as heretofore deemed necessary for shock absorption in a rigid assembly, is not required. At the same time, sidewise shocks and impacts are appropriately absorbed by the side load shock spring assembiles 33, thus preventing damage to the arrangement of weight-sensitive platforms or to the load cells 18, and particularly preventing (in cooperation with the horizontally strong tie rods 27) lateral disarrangement of the platform 15 relative to the load cells.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention, I claim:

1. An apparatus for weighing loads up to predetermined maximum weight comprising a load-receiving platform, an upper platform, a middle platform and a bottom platform, said platforms being disposed in spaced parallel relation to each other by means including weighing means disposed between the bottom platform and the middle platform, the weighing means being adapted for actuation by relative vertical movement of said bottom and middle platforms, resilient means disposed between the middle and upper platforms depressible when the load exceeds the predetermined maximum weight, compressible means disposed between the upper platform and the load-receiving platform; and means for limiting the depression of the resilient means, the limiting means including abutment members, each such member being supported at one end on the bottom platform, the other end being adapted to abut the upper platform when the resilient means is depressed.

2. The apparatus of claim 1 wherein the middle platform is formed to define openings sufficiently large to permit the other end of each of the abutment members to extend into abutment relation with the upper platform.

3. An apparatus for weighing loads up to a predetermined maximum weight comprising a load-receiving platform, an upper platform, a middle platform and a bottom platform, said platforms being disposed in spaced parallel relation to each other by means including weighing means disposed between the bottom platform and the middle platform, the weighing means being adapted for actuation by relative vertical movement of said bottom and middle platforms, resilient means disposed between the middle and upper platforms depressible when the load exceeds the predetermined maximum weight, compressible means disposed between the upper platform and the load-receiving platform; and means for limiting the depression of the resilient means, the limiting means including abutment members, each such member being supported at one end on the bottom platform, the other end being adapted to abut the upper platform when the resilient means is depressed, and means for preventing lateral movement between the several platforms including coacting members on adjacent faces of adjacent platforms, with means connecting said coacting members for maintaining the members in substantially fixed lateral relation.

4. The apparatus of claim 3 having at least two pairs of coacting members between adjacent platforms with at least one pair acting at right angles to at least one other pair.

5. Apparatus for weighing loads, comprising, in combination, load-receiving structure, supporting structure, intermediate structure between the aforesaid structures, and means for maintaining said structures in spaced relation to each other including resilient means between the load-receiving structure and the intermediate structure, depressible to absorb energy of load impact on the load-receiving structure, weight sensitive means between the intermediate structure and the supporting structure, adapted to respond to downward force on said intermediate structure for detecting the weight of the load, and means extending rigidly from one of said supporting and load-receiving structures and engageable with the other of said last mentioned structures upon predetermined downward displacement of said load-receiving structure relative to the supporting structure.

6. Apparatus for weighing loads, comprising, in combination, load-receiving structure, supporting structure, intermediate structure between the aforesaid structures, and means for maintaining said structures in spaced relation to each other including resilient means between the load-receiving structure and the intermediate structure, depressible to absorb energy of load impact on the load-receiving structure, weight sensitive means between the intermediate structure and the supporting structure, adapted to respond to downward force on said intermediate structure for detecting the weight of the load, and means extending rigidly from one of said supporting and load-receiving structures and engageable with the other of said last mentioned structures upon predetermined downward displacement of said load-receiving structure relative to the supporting structure, said resilient means being preloaded to prevent depression thereof and corresponding downward displacement of the load-receiving structure relative to the intermediate structure unless more than a predetermined force is exerted on said load-receiving structure.

7. The apparatus of claim 6, in which the load-receiving structure comprises a pair of vertically spaced platforms, of which the upper is adapted to receive the load and of which the lower is in engagement with said resilient means, and compressible means intermediate said platforms, adapted to absorb energy of load impact on the upper of said platforms.

8. Apparatus for weighing loads, comprising, in combination, load-receiving structure, supporting structure, intermediate structure between the aforesaid structures, and means for maintaining said structures in spaced relation to each other including resilient means between the load-receiving structure and the intermediate structure, depressible to absorb energy of load impact on the load-receiving structure, weight sensitive means between the intermediate structure and the supporting structure, adapted to respond to downward force on said intermediate structure for detecting the weight of the load, means between said intermediate structure and said supporting structure for preventing appreciable, mutual lateral displacement of said last mentioned structures, and means between the load-receiving structure and the intermediate structure and including resilient means yieldable to permit lateral displacement of said load-receiving structure relative to the intermediate structure, for normally maintaining a predetermined lateral relation of said load-receiving and intermediate structures.

9. The apparatus of claim 8, wherein the means preventing mutual lateral displacement of the intermediate and supporting structures comprises a plurality of substantial horizontally disposed members each secured at its ends respectively to the intermediate and supporting structures and each adapted to resist mutual horizontal displacement of its ends but being yieldable to permit vertical displacement between the intermediate and supporting structures.

10. Apparatus for weighing loads, comprising, in combination, load-receiving structure, supporting structure, intermediate structure between the aforesaid structures, and means for maintaining said structures in spaced relation to each other including resilient means between the load-receiving structure and the intermediate structure, depressible to absorb energy of load impact on the load-receiving structure, weight sensitive means between the intermediate structure and the supporting structure, adapted to respond to downward force on said intermediate structure for detecting the weight of the load, means extending rigidly from one of said supporting and load-receiving structures and engageable with the other of said last mentioned structures upon predetermined downward displacement of said load-receiving structure relative to the supporting structure, said resilient means being preloaded to prevent depression thereof and corresponding downward displacement of the load-receiving structure relative to the intermediate structure unless more than a predetermined force is exerted on said load-receiving structure, means between said intermediate structure and said supporting structure for preventing appreciable, mutual lateral displacement of said last mentioned structures, and means between the load-receiving structure and the intermediate structure and including resilient means yieldable to permit lateral displacement of said load-receiving structure relative to the intermediate structure, for normally maintaining a predetermined lateral relation of said load-receiving and intermediate structures.

11. Apparatus for weighing loads, comprising, in combination, load-receiving structure, supporting structure, intermediate structure between the aforesaid structures, and means for maintaining said structures in spaced relation to each other including resilient means between the load receiving structure and the intermediate structure, depressible to absorb energy of load impact on the load receiving structure, weight sensitive electric load cell means between the intermediate structure and supporting structure, said load cell means including portions abutting the supporting and intermediate structure and adapted to respond to downward force on said intermediate structure for detecting the weight of the load.

12. Apparatus for weighing loads, comprising, in combination, load-receiving structure, supporting structure, intermediate structure between the aforesaid structures, and means for maintaining said structures in spaced relation to each other including resilient means between the load-receiving structure and the intermediate structure, depressible to absorb energy of load impact on the load-receiving structure, weight sensitive electric load cell means between the intermediate structure and the supporting structure, said load cell means including portions abutting the supporting and intermediate structures and adapted to respond to the compression of the load cell means resulting from a downward force on said intermediate structure for detecting the weight of the load, and means extending rigidly from one of said supporting and load-receiving structures and engageable with the other of said last mentioned structures upon predetermined downward displacement of said load-receiving structure relative to the supporting structure, said resilient means being preloaded to prevent depression thereof and corresponding downward displacement of the load-receiving structure relative to the intermediate structure unless more than a predetermined force is exerted on said load-receiving structure.

13. Apparatus for weighing loads, comprising, in combination, load-receiving structure, supporting structure, intermediate structure between the aforesaid structures, and means for maintaining said structures in spaced relation to each other including resilient means between the load-receiving structure and the intermediate structure, depressible to absorb energy of load impact on the load-receiving structure, weight sensitive electric load cell means disposed between the intermediate structure and the supporting structure, said load cell means including more than one load cell, each of said cells having portions abutting the supporting structure and the intermediate structure and adapted to respond to downward force on said intermediate structure for detecting the weight of the load, means extending rigidly from one of said supporting and load-receiving structures and engageable with the other of said last mentioned structures upon predetermined downward displacement of said load-receiving structure relative to the supporting structure, said resilient means being preloaded to prevent depression thereof and corresponding downward displacement of the load-receiving structure relative to the intermediate structure unless more than a predetermined force is exerted on said load-receiving structure, means between said intermediate structure and said supporting structure for preventing appreciable, mutual lateral displacement of said last mentioned structures, and means between the load-receiving structure and the intermediate structure and including resilient means yieldable to permit lateral displacement of said load-receiving structure relative to the intermediate structure, for normally maintaining a predetermined lateral relation of said load-receiving and intermediate structures.

14. Apparatus for weighing loads, comprising, in combination, load-receiving structure, supporting structure, intermediate structure between the aforesaid structures, and means for maintaining said structures in spaced relation to each other including resilient means between the load-receiving structure and the intermediate structure, depressible to absorb energy of load impact on the load-receiving structure, electrical weight sensitive means between the intermediate structure and supporting structure, said electrical means including portions abutting the supporting and intermediate structure and adapted to respond to downward force on said intermediate structure for detecting the weight of the load.

15. Apparatus for weighing loads, comprising, in combination, load-receiving structure, supporting structure, intermediate structure between the aforesaid structures, and means for maintaining said structures in spaced relation to each other including resilient means between the load-receiving structure and the intermediate structure, depressible to absorb energy of load impact on the load-receiving structure, electrical weight sensitive means between the intermediate structure and the supporting structure, said electrical means including portions abutting the supporting and intermediate structures and adapted to respond to the compression of the electrical means resulting from a downward force on said intermediate structure for detecting the weight of the load, and means extending rigidly from one of said supporting and load-receiving structures and engageable with the other of said last mentioned structures upon predetermined downward displacement of said load-receiving structure relative to the supporting structure, said resilient means being preloaded to prevent depression thereof and corresponding downward displacement of the load-receiving structure relative to the intermediate structure unless more than a predetermined force is exerted on said load-receiving structure.

16. Apparatus for weighing loads, comprising, in combination, load-receiving structure adapted to hold the load, supporting structure, intermediate structure between the aforesaid structures, and means for maintaining said structures in spaced relation to each other and for absorbing load impact on the load-receiving structure, including resilient means between the load-receiving structure and the intermediate structure, depressible to absorb energy of load impact on the load-receiving structure, and weight sensitive means between the intermediate structure and the supporting structure, responsive to downward force on said intermediate structure for detecting the weight of the load.

References Cited in the file of this patent

UNITED STATES PATENTS

| | | |
|---|---|---|
| 193,762 | Hibbard | July 31, 1877 |
| 779,732 | Newell | Jan. 10, 1905 |
| 1,965,302 | Wagner | July 3, 1934 |
| 1,985,542 | Jacobus | Dec. 25, 1934 |
| 2,002,411 | Moxley | May 21, 1935 |
| 2,197,381 | Mansbendel | Apr. 16, 1940 |
| 2,204,389 | Vater | June 11, 1940 |
| 2,488,349 | Thurston | Nov. 15, 1949 |
| 2,634,081 | Knobel | Apr. 7, 1953 |
| 2,657,921 | MacBride | Nov. 3, 1953 |